United States Patent
Ohrui et al.

[15] 3,647,376
[45] Mar. 7, 1972

[54] METHOD FOR PRODUCING CONCENTRATED NITRIC ACID

[72] Inventors: Tetsuya Ohrui, Niihama-shi; Yasuhito Sakakibara, Saijo-shi, both of Japan

[73] Assignee: Sumitomo Chemical Company, Ltd., Osaka, Japan

[22] Filed: May 16, 1969

[21] Appl. No.: 825,319

[52] U.S. Cl. ...........................................23/160
[51] Int. Cl. .........................................C01b 21/40
[58] Field of Search .........................23/159, 160

[56] References Cited

UNITED STATES PATENTS

| | | | |
|---|---|---|---|
| 1,324,255 | 12/1919 | Jensen | 23/160 |
| 1,948,968 | 2/1934 | Kramer et al. | 23/160 X |
| 2,524,088 | 10/1950 | Shaw | 23/2 |
| 2,615,787 | 10/1952 | Randlett | 23/2 |

FOREIGN PATENTS OR APPLICATIONS 362,908  12/1931  Great Britain ...........................23/160

*Primary Examiner*—Oscar R. Vrtiz
*Assistant Examiner*—G. O. Peters
*Attorney*—Stevens, Davis, Miller & Mosher

[57] ABSTRACT

Subconcentrated nitric acid of 80–90 percent by weight is effectively concentrated to concentrated nitric acid of more than 97 percent by weight using an integrated tower where both stripping of nitrogen peroxide and distillation of subconcentrated nitric acid are carried out. Thus, concentrated nitric acid of more than 97 percent by weight which contains nitrogen peroxide is fed into the upper section of a tower and nitric acid of 80–90 percent by weight is fed into the lower section of the tower and distillation is effected, thereby obtaining concentrated nitric acid of more than 97 percent by weight from the middle stage of the tower.

4 Claims, 1 Drawing Figure

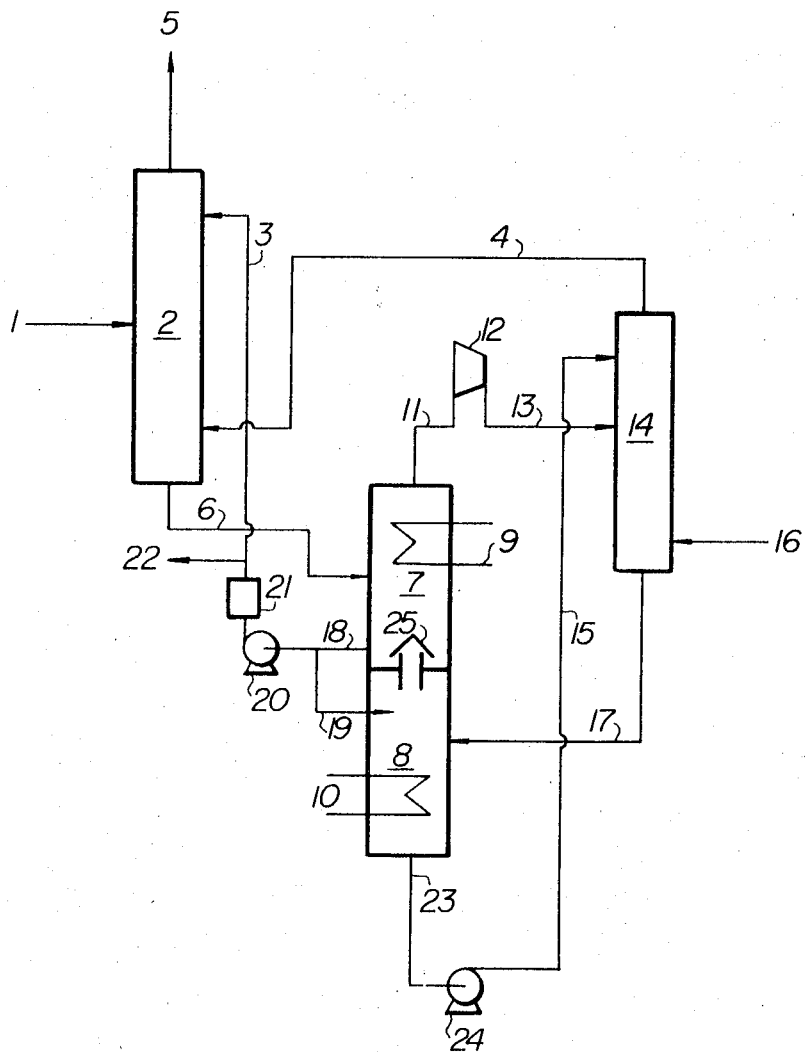

METHOD FOR PRODUCING CONCENTRATED NITRIC ACID

This invention relates to a method for economically producing concentrated nitric acid, peroxide in that concentration of nitric acid and separation of nitrogen peroxide are carried out in a single integrated tower, and an apparatus therefor.

Methods for producing concentrated nitric acid which comprise separating and liquefying nitrogen peroxide obtained by oxidizing ammonia with air and then reacting the said nitrogen peroxide with dilute nitric acid and oxygen under a high pressure have been known, for instance, as HOKO process, EMBSEN process and so on.

According to such methods, a gaseous mixture obtained by oxidation of ammonia with air is washed with cold concentrated nitric acid to absorb nitrogen peroxide gas and then said concentrated nitric acid is heated to strip and separate nitrogen peroxide dissolved therein. The separated nitrogen peroxide gas is cooled and liquefied and thereafter, together with oxygen, is reacted with dilute nitric acid which is produced, for example, during the condensation step of a gas obtained by oxidation of ammonia. Thus, concentrated nitric acid of more than 98percent by weight is produced directly in accordance with the reaction of

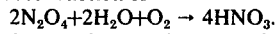
$$2N_2O_4 + 2H_2O + O_2 \rightarrow 4HNO_3.$$

However, since the reaction rate is extremely slow in particular at the last period of the reaction and a long time is required for completion of the reaction, it has been necessary to use commercial oxygen as an oxygen source and to raise the reaction pressure to more than 50 atmospheres.

However, the use of expensive oxygen and increased reaction pressure cause an increase in cost of raw materials and power, thereby spoiling process economics. In order to overcome the above defects, a method has been proposed wherein the concentration of produced nitric acid is kept at 80–90 percent by weight and then this nitric acid is concentrated to 98 percent by weight and then this nitric acid is concentrated to 98 percent by weight.

According to said method, since the severity of the required reaction conditions is extremely mitigated, air can be used as the oxygen source and the reaction pressure can be reduced to less than 10 atmospheres. Thus, said method brings on great economic benefits as to these points. However, nitric acid of 80–90 percent by weight produced must be distilled to more than 97 percent by weight. Consequently, a heat medium such as steam is required as a heat source for said distillation. Thus, said economic benefits are nearly offset.

It is therefore the object of this invention to provide an effective method of producing concentrated nitric acid.

We studied the operating conditions and the heat balance of stripping tower for nitrogen peroxide (referred to as a stripping tower hereinafter) and the distilling for produced nitric acid (referred to as a distilling tower hereinafter) in the process as mentioned above. As the result of this study, we found that under certain conditions the heating calories in the reboiler of the stripping tower and cooling calories in the condenser of the distilling tower are nearly the same. We further found that the temperatures and compositions of contents in both the reboiler and condenser are the same and so a combination of the two towers into one by integrating them is possible.

This invention relates to a method for producing concentrated nitric acid which comprises feeding concentrated nitric acid of more than 97 percent by weight which contains nitrogen peroxide into the upper section of a tower and simultaneously feeding nitric acid of 80–90 percent by weight into the lower section of the tower to effect stripping and distillation and removing nitrogen peroxide from the top of the tower, concentrated nitric acid of more than 97 percent by weight from the middle part of the tower and nitric acid of 68–72 percent by weight from the bottom part.

In the stripping- and distilling-tower of this invention, steam is fed as a heat medium to the reboiler provided at the bottom of the tower. Since the calorie required for distillation is nearly the same as that for stripping as mentioned above, the calorie to be supplied is merely that required for stripping of nitrogen peroxide. That is, the calorie used for stripping is also used for distillation and no additional calorie is required.

The especially important point in this invention is the balance of calories between the upper section and the lower section of the tower. That is, it is important that the calories required in the upper section and the lower section of the tower are nearly the same. For this condition to exist, the concentration of nitrogen peroxide in the concentrated nitric acid its feed rate to the upper section of the tower and the concentration and feed rate of the produced nitric acid {subconcentrated nitric acid (80–90 percent by weight)} to the lower section of the tower should be controlled.

As an example, the production of 1 ton of nitric acid of 98 percent by weight/hr. is illustrated below. In order to distill 1.87 ton/hr. of nitric acid of 85 percent by weight with seven theoretical stages and at a reflux ratio of 0.4 it is necessary to condense 1.4 ton/hr. of vapor of nitric acid of 98 percent by weight, said condensation generates a heat of condensation of $2.2 \times 10^5$ kilocalories/hr. From 3.3 tons/hr. of nitric acid of 98 percent by weight containing 25 percent by weight of nitrogen peroxide, the nitrogen peroxide can be stripped at a reflux ratio of 0.1 with four theoretical stages using said calories developed during said condensation. Furthermore, the amount of nitrogen peroxide to be stripped corresponds to the amount required to produce 1 ton of nitric acid of 98 percent by weight. Therefore, when the concentration of nitric acid produced in the nitric acid producing step is more than about 85 percent by weight, the calories required for stripping and that for distillation are nearly the same so that the produced nitric acid can be concentrated into more than 98 percent by weight by utilizing said calories for a dual purpose. (The term "ton" as used herein refers to the metric system.)

It is obvious that since nitric acid of 85 percent by weight can be easily produced using air as an oxygen source under a reaction pressure of less than 10 atmospheres, the cost of production is extremely improved.

However, if the concentration of the produced nitric acid is less than about 85 percent by weight, the calories required for distillation increases due to the increase in reflux ratio and in feed rate and therefore exceed the calories required for stripping. Thus, the benefits of this invention are decreased by the difference between the both calories.

Further, when the concentration of the produced nitric acid is more than about 85 percent by weight, there is no special disadvantage with regard to calorie, but since the conditions for producing nitric acid become more severe, disadvantage arises therefrom. Therefore, when the stripping and distillation conditions are most economically provided, the most preferably concentration of the produced nitric acid is 83–87 percent by weight, especially about 85 percent by weight.

This invention will be explained with reference to the attached drawing below.

The gas produced by oxidation of ammonia is fed into absorption tower 2 through line 1 and is washed with concentrated nitric acid of 98 percent by weight fed through line 3. The waste gas from a nitric acid producing tower is also introduced into absorption tower 2 through line 4 and unreacted nitrogen peroxide is recovered.

The absorption tower 2 is an aluminum made plate tower and is operated at a room temperature under a pressure 3–7 atm. The concentrated nitric acid discharged from the tower bottom contains 20–30 percent by weight of nitrogen peroxide and is introduced to upper section 7 of the stripping- and distilling-tower through line 6.

The stripping- and distilling-tower is an aluminum and titanium made plate tower and is operated at an atmospheric pressure or 2–3 atm.

Said concentrated nitric acid is directly heated with vapor of nitric acid raising from lower section 8 of the stripping- and distilling-tower through chimney 25 and releases nitrogen peroxide. On the other hand, said vapor of nitric acid from which sensible heat is removed by stripping condenses and is refluxed to the top of lower section 8 from the bottom of the upper section of the stripping- and distilling-tower through lines 18 and 19. The preferable reflux ratio is 0.2-0.5. Released nitrogen peroxide contains small amount of nitric acid and this is removed therefrom by partial condenser 9. At this time, a part of nitrogen peroxide is also condensed. That is, in condenser 9, a part of nitrogen peroxide and nitric acid coexisting therewith are condensed. Thereafter, said nitrogen peroxide is fed to nitric acid producing tower 14 through line 11 and compressor 12 where the pressure is raised to 4-8 atm. Nitric acid producing tower 14 is a titanium made packed tower and nitric acid of 68-72 percent by weight, nitrogen peroxide gas and air are introduced into the top, the middle stage and the bottom through lines 15, 13 and 16, respectively. In the upper stage, nitric acid is produced and in the lower stage, nitrogen peroxide dissolved in nitric acid produced is stripped. Nitric acid of about 83-87 percent by weight produced at reaction condition of pressure of 4-8 atm. and temperature of 50°-80° C. was discharged from the bottom and is fed to lower section 8 of the stripping- and distilling-tower through line 17. This nitric acid is heated at reboiler 10 at the bottom and simultaneously cooled with concentrated nitric acid refluxed through lines 18 and 19 from the upper section, and is separated into nitric acid of 98 percent by weight and nitric acid of 68-72 percent by weight by so-called distillation action. The nitric acid of 98 percent by weight is taken out as a product from the bottom of the upper section 7 of the stripping- and distilling-tower through line 18, pump 20, cooler 21 and line 22. A part of this nitric acid is recycled to absorption tower 2 through line 3. On the other hand, the nitric acid of 68-72 percent by weight is recycled to producing tower 14 through line 23, pump 24 and line 15 and is reused there for producing nitric acid.

As mentioned above, according to this invention, nitric acid of about 85 percent by weight which is easily produced is concentrated into nitric acid of more than 97 percent by weight by distillation and simultaneously therewith, nitrogen peroxide which is necessary for producing nitric acid is separated from nitric acid containing nitrogen peroxide. Thus, the method of this invention is a very effective method thermally.

EXAMPLE 800 kg./hr. of nitric acid of 85 by weight (50°C.) was introduced into the ninth stage (from the bottom) of a stripping-distilling tower (a bubble cap tower) of 30 cm. in diameter having 22 stages . . . (8 stages in upper section and 14 stages in lower section) and 1,300 kg./hr. (30°C.) of concentrated nitric acid of 98 percent by weight having absorbed 25 percent by weight of nitrogen peroxide was introduced to the third stage from the top.

About 250 kg./hr. of steam (4 atm. saturated) was supplied into the reboiler at the bottom of the tower as a heat source. In this case, reflux of the concentrated nitric acid was 170 kg./hr. and that of nitrogen peroxide by partial condensing was 3.4 kg./hr. The pressure at the tower top was atmospheric pressure, the temperature at the tower top was 50° C. and the temperature at the bottom was 140°C.

From the top, 340 kg./hr. of nitrogen peroxide containing nitric acid of 5 percent by weight was taken out and from the bottom, nitric acid of 70 percent by weight was taken out at 365 kg./hr. From the middle stage, nitric acid of 98 percent by weight was taken out at a rate of 1,395 kg./hr. When stripping and distilling were carried out in separate towers, the flow rate of steam used was 400 kg./hr. under said flow rates. Thus, it is clear that according to this invention, the amount of steam used can be sharply reduced.

What we claim is:

1. A method for producing concentrated nitric acid which comprises
   a. feeding a nitric acid containing more than 97 percent by weight of $HNO_3$ and from 20 to 30 percent by weight of nitrogen peroxide to an upper section of a zone,
   b. simultaneously therewith feeding nitric acid of from 80 to 90 percent by weight to a lower section of said zone, said upper and lower sections being separated from each other, but being in open communication with each other through a narrow passageway,
   c. distilling said nitric acid in said lower section to produce a bottoms of nitric acid of from 68 to 72 percent by weight and to generate vapors of nitric acid,
   d. allowing said generated vapors to travel through said passageway into said upper section,
   e. contacting 4vapors of said nitric acid generated in said lower section with said $N_2O_4$-containing nitric acid in said upper section to strip out nitrogen peroxide therein by heating said $N_2O_4$-containing nitric acid with said vapors of nitric acid,
   f. removing said nitrogen peroxide from the top of said upper section, said nitric acid of from 68 to 72 percent from the bottom of said lower section and concentrated nitric acid of more than 97 percent by weight free from $N_2O_4$ from the bottom of said upper section,
   g. refluxing a portion of said concentrated nitric acid withdrawn to said lower section of a said zone,
   h. producing nitric acid of from 80 to 90 percent by weight from said nitrogen peroxide removed from the top of said upper section of said zone, from said nitric acid removed from said bottom of said lower section of said zone and from air,
   i. feeding the nitric acid produced in step (h) to said lower section of said zone according to step (b),
   j. feeding the nitrogen peroxide gas unreacted in said nitric acid producing step (h) and a nitrogen peroxide gas produced by oxidation of ammonia to an absorption tower,
   k. feeding a portion of a said concentrated nitric acid removed from the bottom of said upper section of said zone to said absorption tower,
   l. absorbing said nitrogen peroxide gases of step (j) into said concentrated nitric acid of step (k) in said absorption tower to produce the concentrated nitric acid solution containing more than 97 percent by weight of $HNO_3$ and from 20 to 30 percent by weight of nitrogen peroxide, and
   m. removing said concentrated nitric acid solution produced in step (1) from said absorption tower and feeding same to said upper section of said zone in step (a).

2. A method according a claim 1 wherein the concentration of said nitric acid of steps (b) and (h) is from 83 to 87 percent by weight.

3. A method according to claim 2 wherein said concentration is about 85 percent.

4. A method according to claim 1 wherein the reflux ratio in step (g) is from 0.2 to 0.5.

* * * * *

UNITED STATES PATENT OFFICE
CERTIFICATE OF CORRECTION

Patent No. 3,647,376     Dated March 7, 1972

Inventor(s) Tetsuya Ohrui et al.

It is certified that error appears in the above-identified patent and that said Letters Patent are hereby corrected as shown below:

Please insert the following claim for priority:

--Japanese No. 37444/68 of May 31, 1968--

Signed and sealed this 15th day of August 1972.

(SEAL)
Attest:

EDWARD M. FLETCHER, JR.
Attesting Officer

ROBERT GOTTSCHALK
Commissioner of Patents